United States Patent

Knoll

[15] 3,634,951

[45] Jan. 18, 1972

[54] MOLDED RELIEF SHEETS

[72] Inventor: Ernst Knoll, 7 Winterbergstrasse, 4973 Vlotho (Weser), Germany

[22] Filed: July 28, 1969

[21] Appl. No.: 860,459

Related U.S. Application Data

[62] Division of Ser. No. 620,378, Mar. 3, 1967, Pat. No. 3,458,614.

[30] Foreign Application Priority Data

Mar. 4, 1966 Germany..............................K 58 646

[52] U.S. Cl. ..................................................35/41

[51] Int. Cl. ..................................................G09b 29/12

[58] Field of Search........................35/41, 42, 46 R, 46 A, 26

[56] References Cited

UNITED STATES PATENTS 2,493,439 1/1950 Braund............................35/46 R UX 3,077,040 2/1963 Stieber..................................35/46 R 3,225,461 12/1965 Snyder..................................35/46 R 3,287,193 11/1966 Klein....................................35/26 X

*Primary Examiner*—Harland S. Skogquist

*Attorney*—Richards and Cifelli

[57] ABSTRACT

A relief sheet segment simulating an original relief structure having a visible pattern thereon, the relief sheet segment having been obtained by printing a plastic sheet with an image and thereafter relief molding the sheet, the printed image having been derived from a planar pattern member obtained by flattening a relief pattern member to obtain a primary master pattern, and the printed image on the relief sheet segment having been normalized to conform closely to the visible pattern on the original relief structure by correcting for distortion introduced by flattening said relief pattern member.

3 Claims, 4 Drawing Figures

PATENTED JAN 18 1972

3,634,951

INVENTOR
ERNST KNOLL

MOLDED RELIEF SHEETS

CROSS-REFERENCE TO RELATED APPLICATION

This application is a division of patent application entitled "Method of Manufacture for Molded Composition Relief Sheets," Ser. No. 620,378, filed Mar. 3, 1967, and now U.S. Pat. No. 3,458,614.

BACKGROUND OF THE INVENTION

1. Field of the Invention

The present invention relates to molded relief structures including, but not limited to, topographical maps and, more particularly, to maps of this type composed of molded plastic sheet material. The molded relief sheets of the present invention may be manufactured advantageously by the method disclosed and claimed in the above-identified U.S. Pat. No. 3,458,614.

2. Description of the Prior Art

As is well known, molded relief structures, i.e., three-dimensional structures having a surface in relief, are useful in models and displays, as dies in transferring images, as ink carriers in printing processes, and in many other diverse applications. A very important application of such relief structures is in the filed of topographical maps in which the physical features of a place or geographical region are delineated in minute detail on maps or charts showing the configuration of the surface depicted, including its relief and the elevations of the land masses, the position and contours of its bodies of water, and the roads, cities and other political subdivisions, as well as other aspects of its geography. Therefore, the present invention and its background will be described with reference to topographical relief maps, although it will be apparent to those skilled in the art that the invention is equally applicable to any other desired relief structure.

Previously, one method of manufacturing relief structures and, in particular, topographical relief maps, has been to prepare a molded plastic master pattern with the desired indicia of topographical differentiations, such as elevations above sea level, bodies of water, roads, cities and the like applied in coded colors. In preparing such a master pattern, the first step has been to make a mold in relief reproducing the topography of the area to be depicted. This mold is then employed in conjunction with available molding apparatus, such as a deep draw device for example, which draws a sheet of a suitable flexible plastic material down over the mold so that the plastic conforms closely to and takes the configuration of the relief structure of the mold. The plastic sheet is conventionally an opaque, thermoplastic material of sufficient thickness for adequate mechanical strength, and of a rubberlike elasticity. Such a sheet takes and retains the desired form when heated and forced into intimate contact with the mold, either by the use of a vacuum beneath the sheet to cause air pressure to force it against the mold, or by the use of physical means such as an upper mold activity for this purpose. On cooling and/or setting the molded plastic sheet is removed from the mold.

The upper surface of the resulting molded plastic sheet, which is in relief corresponding to the contours of the geographical area to be depicted, now has the indicia of topographical differentiation applied by hand or any other suitable means according to known techniques to produce a topographical image. Such indicia may be of any desired type suitable for the purpose, such as contour lines or areas of different colors or texture and may be in black and white, or color, or fluorescent or other dyes, for example. The molded plastic relief sheet with the applied topographical image is then restored to its original flat planar form by any suitable conventional means such as by the use of a deep drawing device or by pressing between heated plattens. The resulting flat plastic sheet with a topographical image on its upper surface, commonly in the form of contour lines or colored areas, is then employed as a master pattern for making prints, usually, but not necessarily in colors, by any conventional process, including photographic processes, and silk screen and other printing processes. The prints may be made on any suitable moldable material, but are preferably made on sheets of the opaque, rubberlike plastic material used for the master. The resulting flat prints are then molded over the original relief mold by any suitable conventional procedure as above, for example, by the use of a deep draw device, thus producing colored sheet plastic topographical relief maps.

While topographical maps produced in the manner described above have come into general use, it has long been recognized that such maps have certain inherent disadvantages. One of the most serious of these disadvantages, from the point of view of the cartographer, and those users interested in the accuracy of the map, is that the contour lines and the contour of colored areas or other topographical indicia on such maps do not coincide exactly with the corresponding original indicia applied to the master pattern in its relief form. This is due to the fact that distortion of these contour lines and other indicia is necessarily introduced when the master pattern is converted to the flat form required to permit production of prints. Therefore, the prints reproduced from the flat master pattern do not accurately reflect the exact three-dimensional contours, and topographical image of the master pattern, even after the prints are themselves molded to relief form.

The distortions inherently present in the relief maps of the prior art are also disadvantageous in that they have precluded the manufacture of large topographical maps of satisfactory handling properties and durability. The size of relief map portions which can be produced economically and conveniently from available materials and apparatus according to previously known techniques has been limited. More specifically, the preferred plastic sheet material is available commercially in widths no greater than 5 feet. While it would seem that such materials could be produced in greater widths without difficulty, there has been no reason to do so, since available printing and deep draw molding devices capable of handling greater widths are not presently available, and could only be produced at prohibitive costs. Therefore, as a practical matter, map portions only up to 5 feet in width can be produced by the means of available apparatus. This being the case it is necessary to join a plurality of small sheets or segments up to 5 feet in width in order to produce maps of greater size.

Previously, the assembly of such small sheets or segments of a relief map to form a larger map has presented great difficulty due to the distortions in the contour lines and other topographical image inherently present in such separately produced map segments at the edges. Such distortions are not only introduced by flattening the master relief pattern prior to the production of prints, but also in the printing operation and subsequent relief molding of the printing map segments. It is not surprising, therefore, that neither the physical contours nor the contours of the topographical image at the edges of adjacent relief segments of a large map are seldom in accurate alignment. Any attempt to force the corresponding physical and image contours of adjacent relief segments into proper alignment at the edges of such segments sets up tensions and strains within the plastic sheet material.

Such strains and tensions not only tend to rupture any adhesive or heat sealed bond employed to join adjacent portions of the map, but also adversely affects the pliability of the plastic map and its ability to be rolled up upon itself for carrying or storage. Consequently, such distortions and the resulting tensions adversely affect the handling qualities of a large map and, in time, tend to result in rupture of the bonds between adjacent segments of the map with consequent disintegration of the map. These adverse affects of the inherent distortions in relief maps of the prior art have been experienced regardless of whether adjacent segments of the maps have been joined by means of suitable adhesives or by known heat-sealing techniques. It is apparent, therefore, that it has not previously been possible to produce large relief maps conveniently and economically, which could be rolled and unrolled repeatedly in use without disintegration in a relatively short time, and that distortions in the topographical image and the plastic sheet material adversely affecting the durability and cartographic accuracy of the map could not be avoided.

BRIEF SUMMARY OF THE INVENTION

The present invention makes possible large relief sheets or maps made up of a plurality of relief sheet segments joined together with their edges overlapping, the physical contours and any images on the overlapping portions of the segments being substantially identical to permit accurate nesting of the overlapped portions and accurate mating of the edges of any images on the overlapped and adjacent portions, without introducing tension or strain to the sheet material. This is accomplished by compensating for differing distortions of the physical relief structure and image in adjacent segments of the relief sheet which are introduced into the primary master patterns from which the different segments of the relief sheet are formed when such patterns are reduced from relief to planar form as required to make prints. Correction and conformation of such distortions is accomplished by transferring the image from the planar primary master pattern to a transparent secondary pattern, modifying the image as it is transferred by interpolation in accordance with the degree of distortion indicated by the relationship of an undistorted grid structure and an identical grid structure on the primary master pattern, which has been disoriented by its reduction from relief to planar or flat form. The secondary master pattern formed in this way, having been thus corrected and normalized for distortion of the primary master pattern, is employed in the making of color stencils for use in the printing of sheets to be relief molded into segments of the large relief sheet.

BRIEF DESCRIPTION OF THE DRAWINGS

The invention will now be described in greater detail in conjunction with the accompanying drawings in which like reference characters refer to like parts, and wherein.

DETAILED DESCRIPTION

Figure 1:
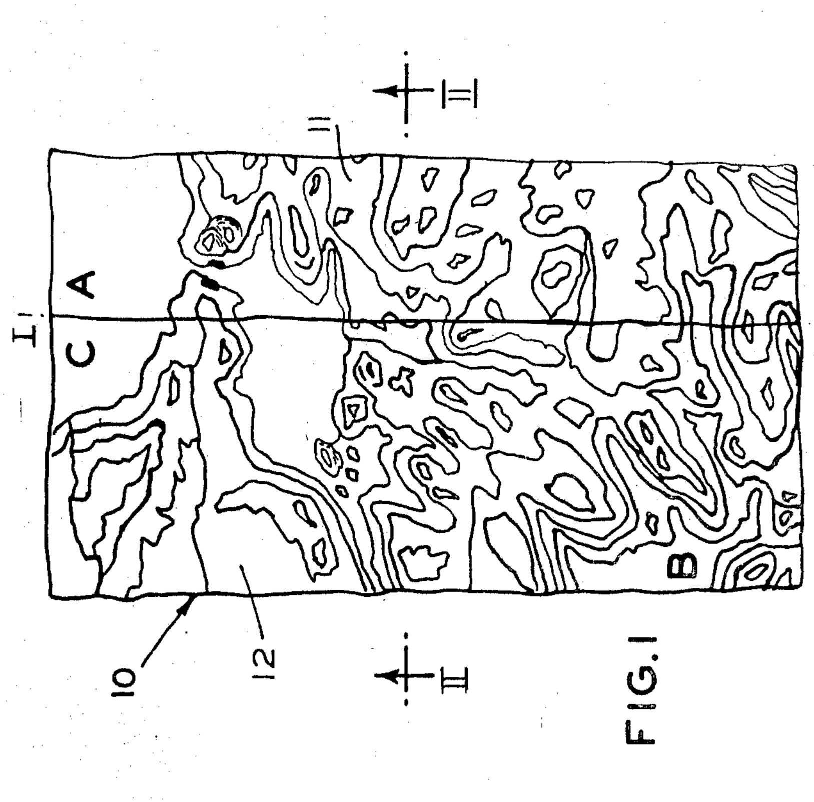
FIG. 1 is a top fragmentary plan view of a topographical relief map of the invention, showing the accurately mated images and relief structures of adjacent segments thereof along the line I—I.
Figure 2:
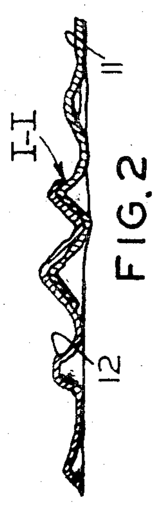
FIG. 2 is a cross-sectional view of the topographical relief map taken on the line II—II of FIG. 1 showing the contours of the relief structure.

Referring now to the drawings in greater detail, a large topographical relief map 10 is shown to be composed of a plurality of segments, of which, only two, 11 and 12, are illustrated for simplicity. Segment 11 has a portion A which has a unique relief structure and topographical image corresponding to and depicting a particular geographic area. Similarly, segment 12 also has portion B, which has a different unique relief structure and topographical image, representing a different geographical area spaced from that represented by portion A of segment 11. Each of the segments 11 and 12 also has an identical portion C adjacent one edge thereof, which represents the geographical area separating but contiguous with the area A and B of segments 11 and 12, respectively. The relief structure of the portions C of segments 11 and 12 being identical, the two portions fit together in nesting relationship without tension or strain when the segments 11 and 12 are overlapped as shown and bonded together by any suitable means such as by the use of available adhesives or by conventional heat-sealing techniques. It will also be seen that the edge of the topographical image of the portion C of segment 12 overlying the portion C of segment 11 mates substantially exactly with the topographical image at the edge of portion A of segment 11 along the line I—I in FIG. 1. The exact nesting of the two segments and accurate mating of the adjacent topographical images along the line I—I which coincides with the edge of segment 12, without forceful alignment or distortion of the segments 11 and 12 to achieve this end, is made possible by correction and normalization or conformation of differing distortions in the relief structures and topographical images of the portions C of the segments 11 and 12 during their manufacture according to the invention as will be described below.

Figure 3:
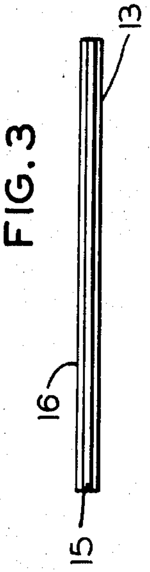
FIG. 3 is an edge view showing a primary master pattern in planar form, an intermediate transparent template and an upper transparent sheet to which the image (not shown) of the primary master pattern is to be transferred to form a secondary master pattern.
Figure 4:
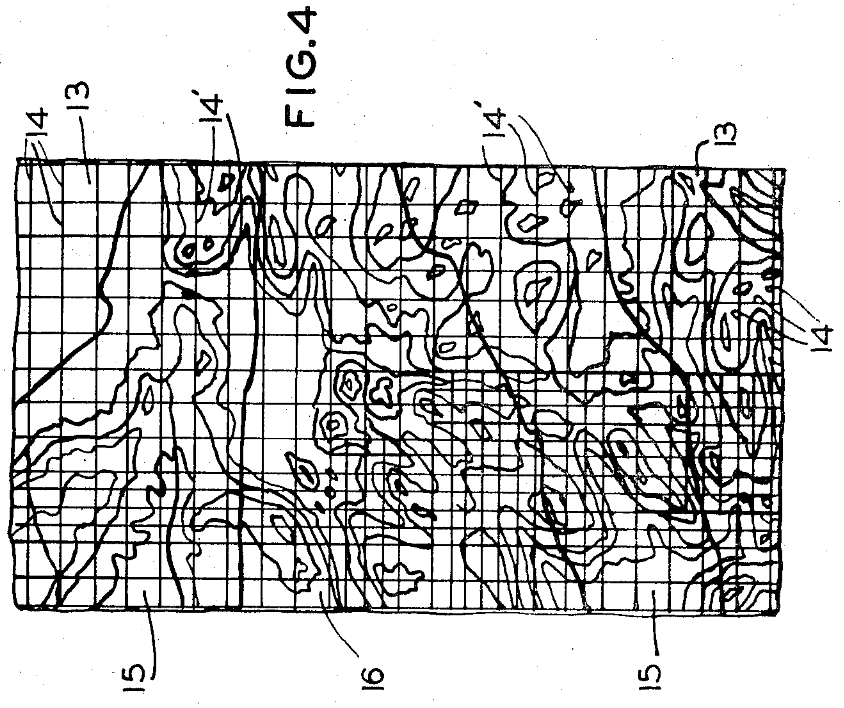
FIG. 4 is a fragmentary top plan view of the structure of FIG. 3 showing a portion of the image on the primary master pattern, including distorted grid lines, the undistorted grid lines of the transparent template, and a portion of a modified image applied to the upper transparent sheet.

Each of the different segments of the relief map 10 is manufactured separately. Sheets about 5 feet square, composed of an opaque thermoplastic material of suitable thickness, mechanical strength, flexibility and elasticity are commercially available and have been used previously in the manufacture of composite relief sheets. Previously such sheets of plastic have been molded over a previously prepared relief mold thus reproducing the physical relief structure of the geographical area to be depicted. This same procedure is followed in the present invention, except that before molding the plastic sheet 13 is provided with a grid 14 which may be printed or stamped on the surface by any suitable means to provide a visible open pattern. The grid is preferably made up of spaced straight lines at right angles forming a plurality of squares, and with heavier lines defining regions containing a number of smaller squares, e.g., 4, 16, etc. The grid may, however, take any other suitable form such as a series of concentric circles divided into segments by radii emanating from the common center point, in order to form a grid for reference purposes. Although the lines of the grid 14 are straight originally, it will be seen in FIG. 4 that these lines are distorted after relief molding of the sheet 13 in accordance with the nature of the relief structure.

The relief molded sheet 13 having the distorted grid 14 on its upper surface is now provided with a topographical image by any suitable method such as by hand painting. The image may be of any suitable type to convey the desired information about the geographical area represented by the molded relief structure. For example, the elevation of various areas on the map may be indicated by the application of contour lines or if desired by coloring the areas defined by the contour lines, with coded colors, such as medium green to indicate an elevation from sea level of up to 300 feet, light green for 300–500 feet, buff for 500–1,000 feet, light brown for 1,000–2,000 feet, and dark brown for 2,000–4,000 feet etc. Lakes may be shown as areas of dark blue, seas and oceans as areas of light blue, rivers may be shown in dark green and cities in red, etc. In applying such indicia to form the topographical image, however, care is taken to preserve the grid 14 on sheet 13.

After applying the topographical image to the molded relief sheet 13 it is reduced to planar or flat form once again by an suitable means such as by the use of a deep draw device or by compressing it between heated plattens, thus completing the formation of a primary master pattern for one segment of the map. The flattening of the primary master pattern in this way is essential to make it useful in reproducing copies by conventional printing techniques as explained above and also for use in the method of this invention. However, flattening of the relief structure causes distortions of the relief structure and the topographical image. This is the source of the problem solved by the present invention. Inasmuch as the relief structures of the unique areas A and B of adjacent segments 11 and 12 are different, when these differing structures are flattened they affect the distortion of the adjacent portions C differently. For this reason the relief structures of the portions C of adjacent relief segments of the prior art did not mate exactly. These slight inaccuracies in adjacent segments of the prior art have caused much difficulty, since they have made it impossible to join adjacent segments of a map with proper alignment of the relief contours and topographical image without stretching or otherwise deforming the mated edges of adjacent segments, thus setting up tensions and strains which eventually rupture the bond between the overlapped segments.

In the present invention, rather than using the primary master pattern to make copies directly for use in assembling the relief maps, a secondary master pattern is first produced which corrects and normalizes the distortions in each segment. Inasmuch as the common or overlapping areas of adjacent segments which would formerly have been distorted differently are now corrected and normalized, the common areas are conformed and thus are adapted to mate accurately. The secondary master pattern is made by the use of a transparent template 15, which may suitably be of the same size as the sheet 13, and which is provided with a grid 14' identical with the original undistorted grid 14 on sheet 13. A transparent sheet 16 coextensive with the template 15 and sheet 13 of the primary master pattern in flat form, is immovably mounted on the template 15. The template-transparent sheet unit is then placed over the primary master pattern with the template 15 in contact with the sheet 13 and with the transparent sheet 16 uppermost. The primary master pattern and template 15 are provided with at least one marginal reference mark and preferably with a plurality of other corresponding reference points to permit the template to be accurately registered with the primary master pattern so that the grid 14' of the template is in exact registration with any undistorted portion of the grid 14 of the primary pattern. Intentionally inappropriate color spots may be added to the master pattern for this purpose. As noted previously, however, the grid 14 of the master pattern has been distorted by flattening of the relief image and, therefore, the grid 14 does not coincide with any portion of the grid 14 which has been distorted. Inasmuch as the distortion of the grid 14 in the flat primary master pattern is proportional to the distortion of the topographical image and relief structure of the sheet 13 at its edges, for example, the area of the spaces between corresponding lines of the distorted grid 14 and undistorted grid 14' are proportional to the degree of distortion of the primary master pattern.

A secondary master pattern is now formed on the transparent sheet 16 by application thereto of a topographical image similar to the image of the primary master pattern as seen through the transparent sheet 16 and template 15, but modified to compensate for the distortion of the primary master pattern. The image on the secondary pattern may also be a colored area image, but it is preferred to use only colored contour lines to delineate the various areas to be colored differently. The modified image may be applied to sheet 16 by hand or by any other suitable means following closely the image on the primary master pattern, but interpolating between the corresponding distorted lines of grid 14 and undistorted lines of grid 14', modifying the contours of the image to a greater or lesser degree in accordance with the degree of divergence of the corresponding grid lines in the area. Starting at the marginal reference mark the template-transparent sheet unit is moved from place to place over the primary pattern as the image within each square or small area is completed, reregistering the undistorted grid after each move before again beginning to apply the image to sheet 16. The distortions in each small area may be treated separately without accumulating distortions from one area to the next. In this way a secondary master pattern is produced on the transparent sheet 16 which has an image corrected and normalized for the distortions of the primary master pattern. It should be noted that the smaller the squares of the grid are made the more accurate the correction for distortion may be made.

The secondary master pattern is then employed according to conventional techniques, to produce any desired quantity of flat prints. For example, a set of color stencils may be made from the secondary master pattern by known techniques and used in a conventional printing process. Photographic, silk screen or any other suitable reproduction techniques may be employed. The flat prints obtained in this way on suitable plastic sheets, for example, are then relief molded, being careful to align the marginal reference marks, on the same mold and apparatus used to make the pattern to produce relief molded map segments. The finished relief segments formed in this way will have the colored contours accurately registered with the relief structure.

The above procedure is repeated to make primary and secondary master patterns and relief molded and printed map segments for each section of the desired map. As is conventional in the art, each segment of the map is provided with an insertion, or edge portion identical with an edge portion of the adjacent segment of the map, thus providing an area of overlap between adjacent sections for purposes of attachment. The edges of the relief segments may be trimmed as necessary to provide a sharp straight line when overlapping the adjacent segment. As noted previously, the segments may be joined by means of a suitable adhesive, by heat-sealing techniques or by taping the seams or joints, or by a combination of these methods.

It will be appreciated in view of the above discussion that the relief sheet segments produced according to the present invention by the use of a distortion-compensated secondary master pattern, are substantially free from both distortion of the relief structure and distortion of the topographical image, thus making it possible to accurately mate adjacent segments without forcibly aligning them and thus setting up tensions and strains in the sheet material. This being the case large relief sheets or topographical maps assembled from such segments are free from internal tension at the junction of the individual segments. For this reason, such large sheets are easy and convenient to handle and are capable of being rolled and unrolled repeatedly without rupturing the bonds between adjacent segments. As will be readily appreciated such a map or relief sheet will have a much longer useful life than the tension loaded sheets of the prior art.

In order to hang large relief sheets or maps, the back of the sheet is provided with a series of loops spaced parallel to a horizontal edge of the sheet and attached to the sheet by heat sealing or other suitable means. A thin lath or rod may be inserted through the loop as a suspension bar, if desired, and may also serve as a core on which to roll the sheet for storage or shipping.

The foregoing illustrates the practice of this invention, which, however, is not to be limited thereby, but is to be construed as broadly as permissible in view of the prior art and limited by the scope of the appended claims.

I claim:

1. In a relief sheet segment simulating an original relief structure having a visible pattern thereon, said relief sheet segment having been obtained by printing a plastic sheet with an image and thereafter relief molding said sheet, said printed image having been derived from a planar pattern member obtained by flattening a relief pattern member to obtain a primary master pattern: the improvement wherein the printed image on said relief sheet segment has been normalized to conform closely to the visible pattern on said original relief structure by correcting for distortion introduced by flattening said relief pattern member and wherein one edge portion of said relief sheet segment has a relief structure and image the same as that of an edge portion of another different relief sheet segment, and whereby the identical edge portions of said segments may be joined in overlapping relation with the images thereof mated without forcible alignment.

2. A large topographical relief map composed of a plurality of relief sheet segments according to claim 1.

3. A relief map according to claim 1 having a plurality of loops attached to the back thereof, spaced apart in a horizontal line, and an elongated rod extending through said loops for use as a support member and core for rolling said map.

* * * * *